United States Patent [19]
Kanemitsu et al.

[11] Patent Number: 5,449,985
[45] Date of Patent: Sep. 12, 1995

[54] ZERO-POWER CONTROL TYPE VIBRATION ELIMINATING APPARATUS

[75] Inventors: Yoichi Kanemitsu; Katsuhide Watanabe, both of Kanagawa, Japan

[73] Assignees: Ebara Corporation; Kajima Corporation, both of Tokyo, Japan

[21] Appl. No.: 111,412

[22] Filed: Aug. 25, 1993

[30] Foreign Application Priority Data

Aug. 26, 1992 [JP] Japan .................................. 4-250596

[51] Int. Cl.6 ............................................. F16F 15/03
[52] U.S. Cl. ................................. 318/128; 318/649; 310/51
[58] Field of Search ................. 310/51, 90.5; 318/128, 318/629, 649; 248/638

[56] References Cited

U.S. PATENT DOCUMENTS

| | | | |
|---|---|---|---|
| 3,650,581 | 3/1972 | Boden et al. | 310/90.5 |
| 3,860,300 | 1/1975 | Lyman | 310/90.5 |
| 4,908,536 | 3/1990 | Hudimac | 310/51 |

FOREIGN PATENT DOCUMENTS

| | | |
|---|---|---|
| 0246098 | 11/1987 | European Pat. Off. . |
| 0514877 | 11/1992 | European Pat. Off. . |
| 50-22648 | 8/1975 | Japan . |
| 52-30657 | 8/1977 | Japan . |
| 62-11218 | 3/1987 | Japan . |
| 2-203040 | 8/1990 | Japan . |

OTHER PUBLICATIONS

Patent Abstracts of Japan, vol. 14, No. 495 (M-1041) Oct. 29, 1990.
Patent Abstracts of Japan, vol. 14, No. 333 (P-1078) Jul. 18, 1990.
Patent Abstracts of Japan, vol. 13, No. 253 (P-883) Jun. 13, 1989.
Eisenhaure et al., "Magnetic Bearing for Precision Linear Slides", pp. 67–79, date unknown.
Hiyama et al., "Magnetic Bearing", EBARA JIHO, No. 138 (1987-7), pp. 7–11, Sep. 1987.

*Primary Examiner*—Steven L. Stephan
*Assistant Examiner*—Judson H. Jones
*Attorney, Agent, or Firm*—Wenderoth, Lind & Ponack

[57] ABSTRACT

There is provided a vibration eliminating apparatus utilizing a magnetic suspending system which achieves zero power control. The vibration eliminating apparatus includes a table on which equipment to be installed, magnetic yokes fixed on the table, control magnets for suspending the magnetic yokes from an installation floor, displacement sensors for measuring gaps between the control magnets and the magnetic yokes, power amplifiers for supplying exciting currents to the control magnets, and compensation circuits for controlling the exciting currents of the control magnets by supplying outputs from the displacement sensors to the power amplifiers. Each control magnet includes a permanent magnet for generating a bias magnetic flux and an electromagnet for generating a control magnetic flux to form a magnetic circuit. An integrated value of the exciting current fed to the electromagnet is fed back to the power amplifier.

2 Claims, 3 Drawing Sheets

5,449,985

ZERO-POWER CONTROL TYPE VIBRATION ELIMINATING APPARATUS

BACKGROUND OF THE INVENTION

1. Field of the Invention

The present invention relates to a vibration eliminating apparatus and particularly to a vibration eliminating apparatus for eliminating any vibration from an installation floor by suspending by means of a magnetic force a vibration-free table on which equipment is installed to be isolated from vibration.

2. Description of the Related Art

Equipment such as electromicroscopes and semiconductor manufacturing apparatuses or the like which must be isolated from vibration is installed on a vibration eliminating apparatus in factories. Instead of a conventional vibration eliminating apparatus utilizing pneumatic springs or rubber, a vibration eliminating apparatus utilizing magnetic suspension means has been developed to realize excellent vibration suppressing characteristics, as disclosed in detail in Japanese Patent Laid-Open No. 203040/92.

FIG. 1 schematically illustrates an example of the structure of a basic vibration eliminating apparatus using a magnetic suspending system. Equipment such as electromicroscopes, semiconductor manufacturing apparatuses or the like (not illustrated) which must be isolated from vibration is mounted on a vibration-free table 1. The table is maintained without any contact with an installation floor (not shown) by means of electromagnetic actuators 2. Therefore, even if the installation floor on which the electromagnetic actuators 2 are installed vibrates due to earthquakes or any other reason, no vibration is transmitted to the vibration-free table 1 and therefore the equipment on the table 1 is not affected by vibration of the installation floor.

FIG. 2 shows the structure of the electromagnetic actuator used in the vibration eliminating apparatus shown in FIG. 1. Yokes 3 consisting of a magnetic material are fixed to the vibration-free table 1 on which equipment (not shown) which must be isolated from vibration is installed. Electromagnets 4 fixed on an installation floor 6 suspend the magnetic yokes 3 by means of magnetic attracting forces. A gap between a magnetic pole of the electromagnet 4 and the magnetic yoke 3 can be measured with a displacement sensor 5. A controller 7 includes compensation circuits 9 and power amplifiers 10 whereby an excitation current flowing through electromagnet 4 is controlled in accordance with an output from the displacement sensor 5 so that the vibration-free table 1 to which the magnetic yokes 3 are fixed may be stably suspended.

However, the vibration eliminating apparatus using magnetic suspending forces as explained above is disadvantageous in that a heavy current flows continuously through the excitation coils of the electromagnets, resulting in the generation of excessive heat from the excitation coils and a large power loss, because the electromagnets must always be excited to suspend the vibration free table.

SUMMARY OF THE INVENTION

In view of such technical problems of the related art, it is an object of the present invention to provide a vibration eliminating apparatus using magnetic suspending forces based on a zero-power control by which no excitation current flows through electromagnets under a balanced state.

In order to achieve the objects described above, a vibration eliminating apparatus of the present invention comprises a table for the installation of equipment thereon; magnetic members fixed on the table; control magnets fixed on an installation floor for suspending the magnetic members by means of a magnetic force; displaceraent sensors for measuring gaps between the control magnets and the magnetic members; means for exciting the control magnets; and compensating means for controlling excitation currents fed to the control magnets by applying outputs from the displacement sensors to the exciting means. Each of the control magnets comprises a permanent magnet for generating a bias magnetic flux and an electromagnet for generating a control magnetic flux. The vibration eliminating apparatus further comprises circuits for feeding back integrated values of the exciting currents to the exciting means.

In the vibration eliminating apparatus of the present invention, each of the control magnets for suspending the table with magnetic attracting forces includes a permanent magnet for generating a bias magnetic flux and an electromagnet for generating a control magnetic flux to form a magnetic circuit. Moreover, circuits for feeding back integrated values of exciting currents fed to the electromagnets are also provided. Therefore, in a balanced state where the table has been raised up to a predetermined target position with magnetic attracting forces of the electromagnets, the exciting currents become zero by feeding back integrated values of the exciting currents to the exciting means and the table is suspended by only the bias magnetic fluxes of the permanent magnets. Accordingly, zero power control requiring no exciting current to achieve a suspending table in a balanced state can be achieved.

DETAILED DESCRIPTION OF THE PREFERRED EMBODIMENT

Figure 1:
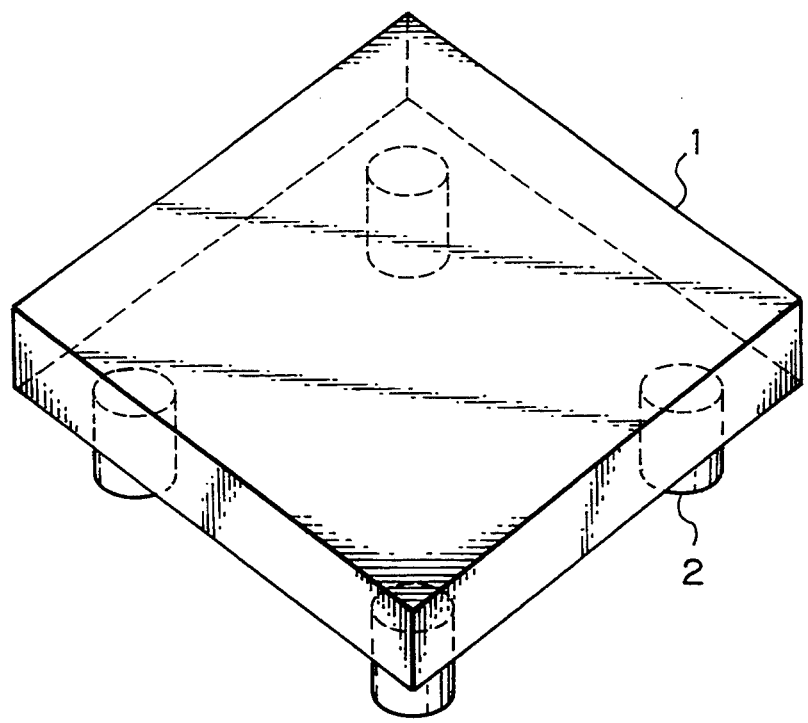
FIG. 1 is a perspective view schematically illustrating the basic structure of a vibration eliminating apparatus.
Figure 2:
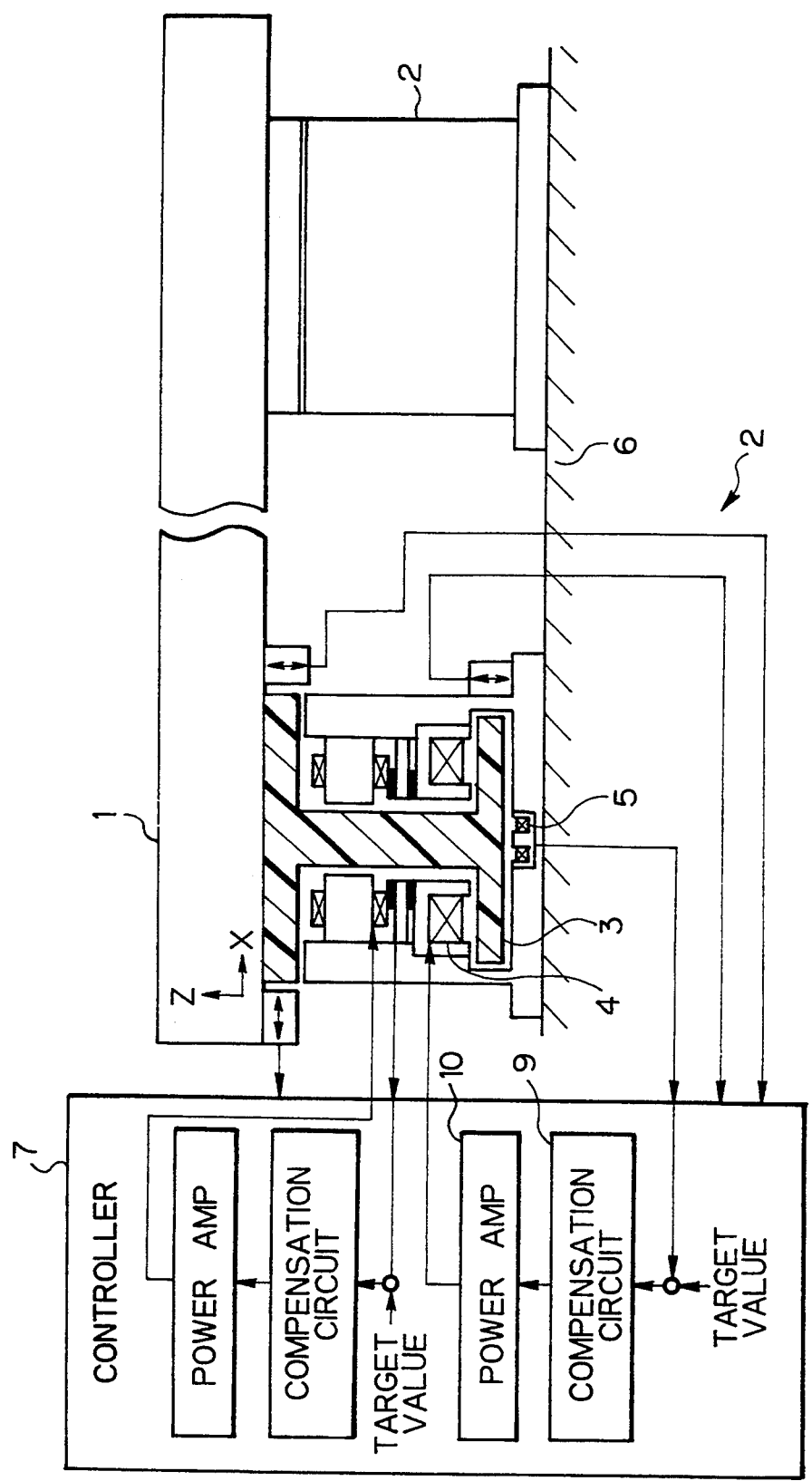
FIG. 2 shows the structure of the electromagnetic actuator shown in FIG. 1 with a controller therefor.
Figure 3:
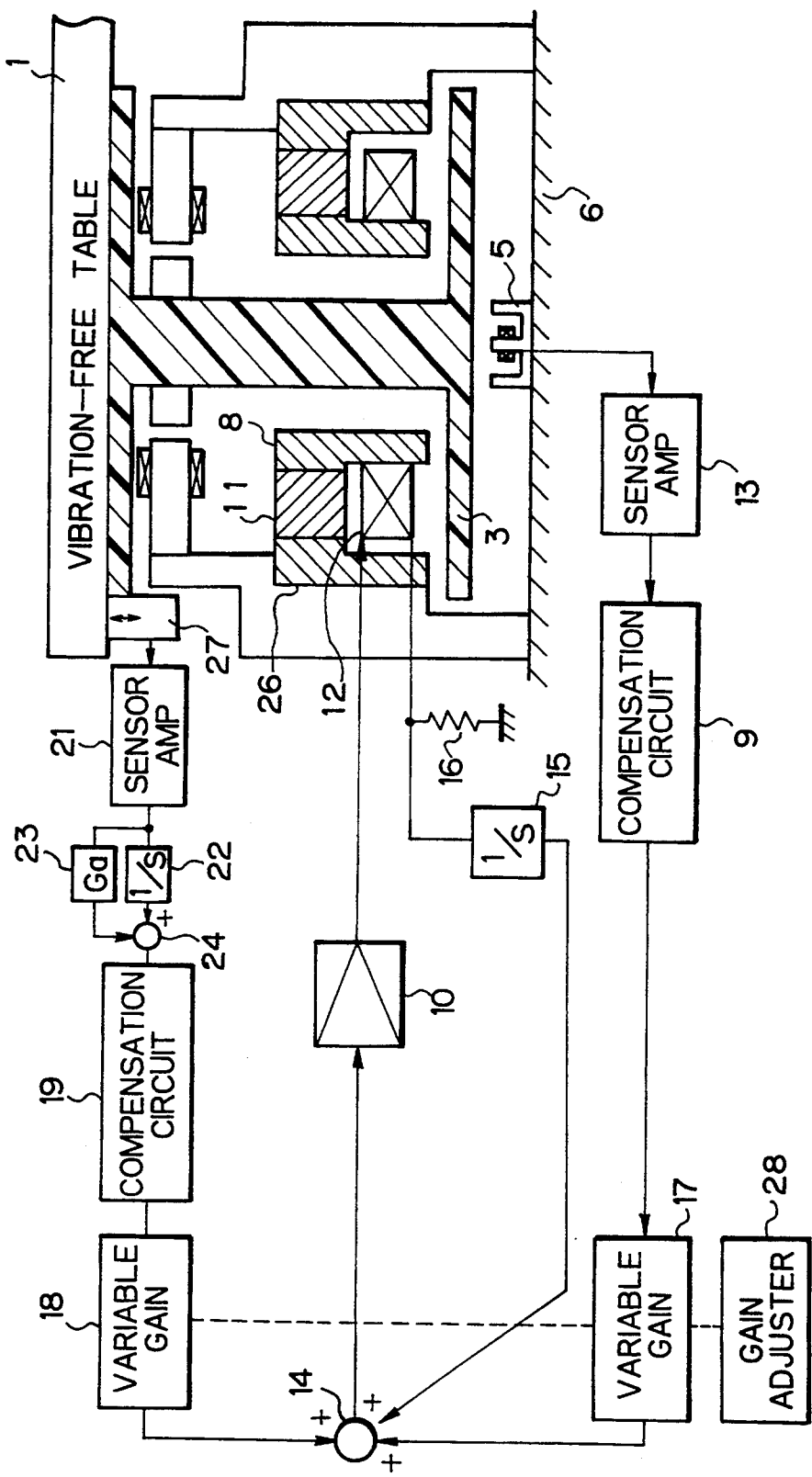
FIG. 3 illustrates the structure according to a vibration eliminating apparatus of the present invention.

FIG. 3 shows the structure of a preferred embodiment having a vibration eliminating apparatus of a magnetic suspending system according to the present invention. Equipment (not illustrated) such as an electromicroscope, semiconductor manufacturing apparatus or the like which must be isolated from vibration is installed on a vibration-free table 1 which is suspended from an installation floor 6 by electromagnetic actuators. The vibration-free table 1 is provided with magnetic yokes 3 and is suspended by magnetic attracting forces exerted by control magnets 26. The structure described above is similar to that of the existing vibration eliminating apparatus shown in FIG. 2 and like structural elements are designated by like reference numerals and an explanation thereof is omitted here.

In this embodiment, as illustrated in the figure, each of the control magnets 26 to suspend the vibration free table 1 with magnetic attracting forces comprises a permanent magnet 11 for generating a bias magnetic flux and an electromagnet 8 for generating a control magnetic flux. The permanent magnet 11 and electromagnet 8 form a magnetic circuit. The permanent magnets 11 generate magnetic fluxes sufficient to suspend the vibration-free table 1, on which equipment which must be isolated from vibration is installed. The electromagnets 8 generate magnetic fluxes to raise the vibration-free table 1 up to a target position where the vibration-free table 1 is suspended by the permanent magnets 11, and suppress vibration of the vibration-free table in a balanced state on the basis of outputs from acceleration sensors 27.

An exciting current flowing through an exciting coil 12 of any one of the electromagnets 8 generates a voltage across a shunt-resistor 16 and this voltage is integrated by an integrator 15. The integrated voltage is fed back to a power amplifier 10 via an adder 14. With this feedback operation, the output of the power amplifier 10, namely an exciting current supplied to the exciting coil 12, becomes zero in the balanced state.

The vibration eliminating apparatus of the present invention achieves zero power control by an electric current positive-feedback system described above along with a displacement feedback system explained hereunder and including relative and absolute control subsystems. The relative control subsystem which suppresses vibration of the vibration-free table 1 based on an output from the displacement sensor 5 is structured as explained hereunder. An output of the displacement sensor 5 fixed on the installation table 6 is amplified by a sensor amplifier 13. A compensation circuit 9 adjusts a gain and a phase of the output of the sensor amplifier 13 and generates a control signal for controlling a position of suspension of the vibration free table 1. The control signal is gain-adjusted by a variable gain circuit 17, power-amplified by the power amplifier 10 and then applied to the exciting coil 12 of the electromagnet 8 to control the magnetic attracting force of the electromagnet 8.

The absolute control subsystem is structured as explained hereunder. An acceleration sensor 27 for detecting acceleration generated at the table 1 in the vertical direction is fixed at one end of the vibration-free table 1. Therefore, absolute vertical acceleration of the vibration-free table 1 can be detected by the acceleration sensor 27. The output of the acceleration sensor 27 is amplified by a sensor amplifier 21 and is then applied to an adder 24 via a proportional circuit 23 and an integral circuit 22. Thus, a signal corresponding to the vertical acceleration and a signal representing velocity converted from the acceleration by the integral circuit 22 are applied together to the adder 24. The output of the adder 24 is gain- and phase-adjusted by a compensating circuit 19 and moreover gain-adjusted by a variable gain circuit 18 in order to generate a control signal by which vibration transmitted to the vibration-free table 1 is suppressed. The control signal is power-amplified by the power amplifier 10 and then applied to the exciting coil 12 of the electromagnet 8.

Gains of both variable gain circuits 17 and 18 may be changed in an interlocking relationship with each other by a gain adjuster 28. The gain adjuster 28 changes the gains of the variable gain circuits 17 and 18 so that when a gain of one of the variable gain circuits is maximum, a gain of the other circuit is minimum, and that the gain of one of the variable gain circuits is gradually lowered to a minimum, the gain of the other circuit increases gradually to a maximum.

Operations of the vibration eliminating apparatus will then be explained by means of the operation at one supporting point as shown in FIG. 3. A gain of the variable gain circuit 17 in the relative control subsystem is set to a maximum, while a gain of the variable gain circuit 18 in the absolute control subsystem is set to a minimum. Therefore, at the time of initiation, only the relative control subsystem operates and the vibration-free table 1 is raised up to a predetermined target position by means of the magnetic flux of the electromagnet 8 and the bias magnetic flux of the permanent magnet 11 both acting on the magnetic yoke 3. A magnetic attracting force exerted on the magnetic yoke 3 by the electromagnet 8 is controlled by the compensating circuit 9 and the power amplifier 10 in accordance with a gap between the control magnet 25 and the magnetic yoke 3 detected by the displacement sensor 5.

An exciting current flowing through the electromagnet 8 becomes zero in such a position that the gravity of the vibration-free table 1, supporting equipment which must be isolated from vibration, and a magnetic attracting force exerted by the bias magnetic flux of the permanent magnet 11 are balanced, whereby the vibration-free table 1 stops in that position in a balanced state. During an upward movement of the vibration-free table, an output current of the power amplifier 10, namely an exciting current applied to the exciting coil 12 of the electromagnet 8, flows through the shunt resistor 16 to generate a voltage thereacross. This voltage is then integrated by the integrator 15 and fed back to the power amplifier 10 via the adder 14. As a result of the feedback loop for such an integral operation as explained above, the output of the power amplifier 10 becomes zero in the balanced state taken in the relative control subsystem and thus, a power required for controlling the electromagnet 8 becomes zero. Accordingly, when the vibration-free table 1 is raised by the relative control subsystem to the suspended position where the bias magnetic flux of the permanent magnet 11 and the gravity of the vibration-free table 1 are balanced, the exciting current flowing through the electromagnet 8 becomes zero and the vibration-free table 1 is maintained at the suspended target position without consuming electric power.

After the vibration-free table 1 is stably suspended and the system is in a balanced state, the control system is switched to the absolute control subsystem from the relative control subsystem by increasing the gain of the variable gain circuit 18 of the absolute control subsystem as the gain of the variable gain circuit 17 of the relative control subsystem is lowered gradually. When the control system is once switched to the absolute control subsystem, a signal representing absolute acceleration detected by the acceleration sensor 27 is amplified by the sensor amplifier 21 and then converted to an acceleration signal by the proportional circuit 23 and to a velocity signal by the integral circuit 22. On the basis of these signals, a control signal which gives dumping for suppressing acceleration and velocity is generated by the compensation circuit 19. The control signal is applied to the exciting coil 12 of the electromagnet 8 through the variable gain circuit 18 of which gain is set to the maximum value, the adder 14 and the power amplifier 10, giving a dumping force to suppress vibration of the vibration-free table 1 with the control magnetic flux of the electromagnet 8.

After the vibration detected by the acceleration sensor 27 is dumped establishing the balanced state, the electromagnet 8 is zero-power controlled with the operations of the loop through which the output of the power amplifier 10 is fed back through the integrator 15.

As explained above, the vibration eliminating apparatus of the present invention comprises control magnets each including a permanent magnet and an electromagnet and an integrated value of an exciting current flowing through the electromagnet is fed back to a power amplifier. Since zero-power control can be achieved with such a structure, it is not necessary to apply an exciting current to the electromagnet in a balanced state of the system. Therefore, a large electric power which has been required in a conventional apparatus is unnecessary and considerable power savings can be achieved. In addition, since a vibration-free table is absolutely controlled on the basis of acceleration exhibited by the table, when the vibration-free table is once stably suspended, vibration eliminating characteristics can be improved.

What is claimed is:

1. A vibration eliminating apparatus comprising: a table upon which equipment to be isolated for vibration is supported; magnetic members fixed to said table; acceleration sensors fixed to said table; control magnets for suspending said magnetic members with magnetic forces; displacement sensors for measuring gaps between said control magnets and said magnetic members; means for exciting said control magnets; compensating means for controlling exciting currents flowing through said control magnets by applying an output from said displacement sensors to said exciting means, said compensating means including a first variable gain circuit through which the output of each of said displacement sensors is applied, each of said control magnets comprising a permanent magnet for generating a bias magnetic flux and an electromagnet for generating a control magnetic flux to form a magnetic circuit; means for feeding back integrated values of the exciting currents of said electromagnets to said exciting means; and a second variable gain circuit through which the output of each of said acceleration sensors is supplied to said exciting means, gains of said first and second variable gain circuits being changeable in an interlocking relationship with each other.

2. A vibration eliminating apparatus according to claim 1, further comprising a means by which, at the start of said apparatus, a gain of said second variable gain circuit is set to a minimum value and a gain of said first variable gain circuit to a maximum value and, after said table is suspended, the gain of said second variable gain circuit can be increased as the gain of said first variable gain circuit is decreased.

* * * * *